United States Patent [19]
Anderson

[11] Patent Number: 5,266,024
[45] Date of Patent: Nov. 30, 1993

[54] THERMAL NOZZLE COMBUSTION METHOD

[75] Inventor: John E. Anderson, Somers, N.Y.

[73] Assignee: Praxair Technology, Inc., Danbury, Conn.

[21] Appl. No.: 952,221

[22] Filed: Sep. 28, 1992

[51] Int. Cl.⁵ ............................................. F23D 11/44
[52] U.S. Cl. ....................................... 431/11; 431/10
[58] Field of Search ................................... 431/10, 11

[56] References Cited

U.S. PATENT DOCUMENTS

| | | | |
|---|---|---|---|
| 3,689,039 | 9/1972 | Kilgren | 431/11 |
| 4,378,205 | 3/1983 | Anderson | 431/5 |
| 4,431,400 | 2/1984 | Kobayashi et al. | 431/6 |
| 4,525,138 | 6/1985 | Snyder et al. | 431/187 |
| 4,541,796 | 9/1985 | Anderson | 431/187 |
| 4,541,798 | 9/1985 | Miller et al. | 431/266 |
| 4,693,680 | 9/1987 | Snyder et al. | 431/10 |
| 4,738,614 | 4/1988 | Snyder et al. | 431/8 |
| 4,892,475 | 1/1990 | Farrenkopf et al. | 431/8 |
| 4,907,961 | 3/1990 | Anderson | 431/8 |
| 4,928,605 | 5/1990 | Suwa et al. | 431/11 |
| 4,969,814 | 11/1990 | Ho et al. | 431/8 |
| 5,100,313 | 3/1992 | Anderson et al. | 431/8 |
| 5,104,310 | 4/1992 | Saltin | 431/10 |
| 5,110,285 | 5/1992 | Snyder et al. | 431/8 |
| 5,149,261 | 9/1992 | Suwa et al. | 431/11 |

Primary Examiner—Carroll B. Dority
Attorney, Agent, or Firm—Stanley Ktorides

[57] ABSTRACT

A method for providing oxidant into a combustion zone employing a thermal nozzle converting thermal energy into kinetic energy whereby a high injection velocity may be attained even at a low oxidant supply pressure and the injection velocity may be varied at any given supply pressure without changing nozzles or using an adjustable nozzle.

6 Claims, 2 Drawing Sheets

THERMAL NOZZLE COMBUSTION METHOD

TECHNICAL FIELD

This invention relates generally to combustion with an oxidant having an oxygen concentration which exceeds that of air, and is particularly advantageous where the oxidant is available only at a relatively low pressure.

BACKGROUND ART

With the increasing costs of fuel it has become important in the field of combustion to carry out combustion with decreased amounts of fuel. It has long been known that one way for reducing fuel consumption is to carry out the combustion using oxygen or oxygen-enriched air as the oxidant as this reduces the amount of nitrogen passing through the combustion reaction which absorbs heat generated by the combustion reaction. Thus more heat is available for the intended purpose for any given amount of fuel.

One problem with the use of oxygen or oxygen-enriched air as the oxidant in a combustion reaction is that the higher temperatures resulting from such reaction kinetically favor the formation of nitrogen oxides ($NO_x$), which are known pollutants. Recent work in combustion technology has addressed this issue and has resulted in advances which enable the use of oxygen or oxygen-enriched air in combustion processes without generating inordinate levels of $NO_x$. Several such recent advances in combustion technology are disclosed and claimed in U.S. Pat. No. 4,378,205—Anderson, U.S. Pat. No. 4,541,796—Anderson, U.S. Pat. No. 4,907,961—Anderson, and U.S. Pat. No. 5,100,313—Anderson et al.

Many of these recent advances which enable the use of oxygen or oxygen-enriched air in combustion processes while avoiding the generation of large quantities of $NO_x$ require that the oxidant be provided into the combustion zone at a high velocity. Herein lies a problem because high velocity injection requires a high oxidant pressure and often the oxidant is not available from its source at the requisite high pressure. In these situations the oxidant generally is compressed to the requisite high pressure by use of a compressor. This is undesirable because the use of a compressor increases both the capital and operating costs of the combustion system and also because compressing oxidant, especially when the oxidant is technically pure oxygen, introduces a degree of risk to the system.

It is desirable therefore to have a method whereby the velocity of oxidant injected into a combustion zone may be increased over what would otherwise be possible given the source pressure of the oxidant, while reducing or eliminating the need for compressing the oxidant by passing it through a compressor.

It is known that one way for increasing the velocity of oxidant injected into a combustion zone is to inject the oxidant into the combustion zone through a mechanical nozzle. A mechanical nozzle is an orifice having a reduced diameter over that of the oxidant supply conduit so that as the oxidant passes through the orifice into the combustion zone its velocity is increased. However, this has only limited benefit because a relatively high pressure is still required to effectively pass the oxidant through the narrow orifice. Another important limitation of a mechanical nozzle system is that for a given oxidant flow rate the velocity of the oxidant injected into the combustion zone cannot be changed without also changing the nozzle or using a very complicated adjustable nozzle. Changing nozzles is cumbersome and time consuming as well as being dangerous, and adjustable nozzles are expensive and also prone to breakdown when exposed to the harsh environment of a combustion zone.

Accordingly, it is an object of this invention to provide a combustion method wherein the velocity of oxidant injected into a combustion zone may be increased over what would otherwise be possible given the source pressure of the oxidant, while reducing or eliminating the need for compressing the oxidant by passing it through a compressor.

It is another object of this invention to provide a combustion method wherein the velocity of oxidant injected into a combustion zone, for any given supply pressure, may be controlled or varied without the need for changing injection nozzles or using an adjustable nozzle.

SUMMARY OF THE INVENTION

The above and other objects which will become apparent to one skilled in the art upon a reading of this disclosure are attained by the present invention, one aspect of which is:

Thermal nozzle combustion method comprising:

(A) providing oxidant having an oxygen concentration of at least 30 volume percent at an initial velocity within an oxidant supply duct communicating with a combustion zone;

(B) providing fuel into the oxidant supply duct and combusting up to about 20 percent of the oxygen of the oxidant provided into the oxidant supply duct with the fuel to produce heat and combustion reaction products;

(C) mixing combustion reaction products with remaining oxygen of the oxidant within the oxidant supply duct and raising the temperature of remaining oxidant within the oxidant supply duct; and (D) passing heated oxidant out from the oxidant supply duct into the combustion zone at an exit velocity which exceeds the initial velocity.

Another aspect of the invention is:

Thermal nozzle combustion method comprising:

(A) providing oxidant having an oxygen concentration of at least 30 volume percent at an initial velocity within an oxidant supply duct communicating with a combustion zone;

(B) providing heat within the oxidant supply duct;

(C) passing heat provided within the oxidant supply duct to the oxidant and raising the temperature of the oxidant within the oxidant supply duct;

(D) passing heated oxidant out from the oxidant supply duct into the combustion zone at an exit velocity which exceeds the initial velocity;

(E) providing combustible matter into the combustion zone separately from the oxidant which is passed into the combustion zone through the oxidant supply duct; and (F) combusting combustible matter and oxidant within the combustion zone.

DETAILED DESCRIPTION

In general the invention is a method for converting thermal energy into kinetic energy to overcome the problem of low oxidant velocity due to relatively low oxidant supply pressure. The method enables one to reduce or eliminate the use of an oxidant compressor. A very important additional benefit of the invention is that the invention enables the practitioner to vary or control the velocity of the oxidant injected into the combustion, without the need for changing nozzles or using an adjustable nozzle or increasing the oxygen flow rate, by varying the thermal energy put into the system and thus controlling the kinetic energy generated during the process.

The invention will be described in greater detail with reference to the Drawings.

Figure 1:
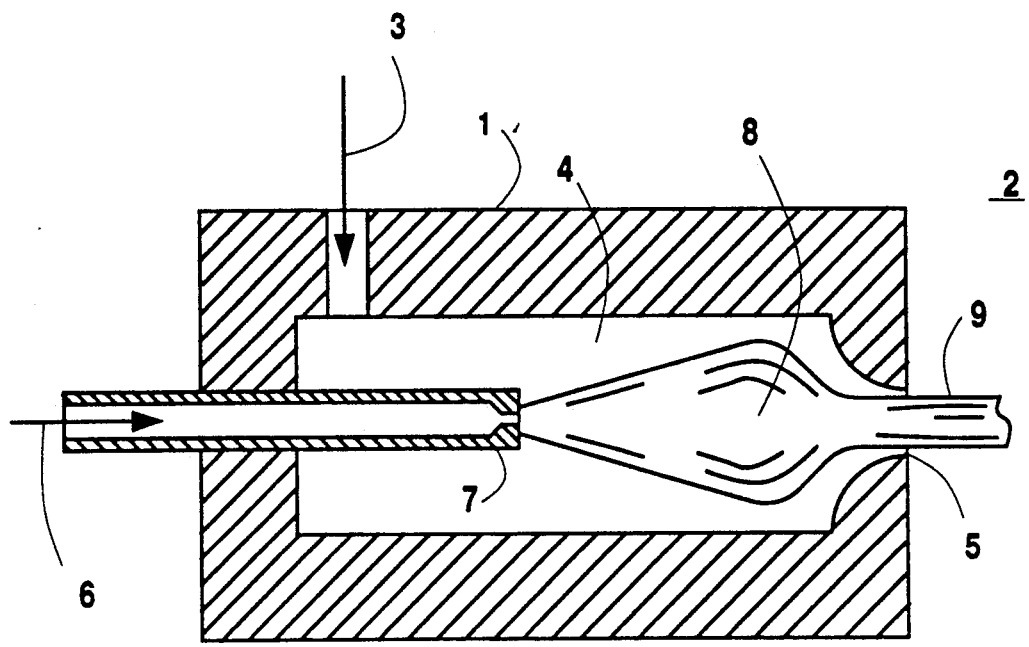
FIG. 1 is a cross-sectional representation of one preferred embodiment of a device which may be used to practice the thermal nozzle combustion system of this invention.

Referring now to FIG. 1, thermal nozzle 1 is a lance through which oxidant is provided into combustion zone 2. In the practice of this invention oxidant 3, having an oxygen concentration of at least 30 volume percent and preferably at least 85 volume percent is provided within oxidant supply duct 4 which communicates with combustion zone 2 through opening 5. Most preferably the oxidant is technically pure oxygen having an oxygen concentration of 99.5 percent or more. Within oxidant supply duct 4 the oxidant has an initial velocity which is generally within the range of from 50 to 300 feet per second (fps) and typically will be less than 200 fps.

In the broad practice of this invention heat is provided within the oxidant supply duct by any suitable means such as by combustion, by an electric arc or by electrical resistance heating. FIG. 1 illustrates a preferred embodiment of the invention wherein heat is provided to the oxidant supply duct by combustion within the oxidant supply duct. In this preferred practice of the invention, fuel is provided into oxidant supply duct 4 through fuel nozzle 7 which may be any suitable nozzle generally used for fuel injection. The fuel may be any suitable combustible fluid examples of which include natural gas, methane, propane, hydrogen and coke oven gas. Preferably the fuel is a gaseous fuel. Liquid fuels such as number 2 fuel oil may also be used, although it would be harder to maintain good mixing and reliable and safe combustion within the oxidant supply duct with a liquid fuel than with a gaseous fuel.

The fuel provided into the oxidant supply duct combusts with oxidant within the oxidant supply duct to produce heat and combustion reaction products such as carbon dioxide and water vapor. It is an important element of this invention that no more than about 20 percent of the oxygen of the oxidant combusts within the oxidant supply duct or else insufficient oxygen may be provided into the combustion zone to carry out the subsequent combustion. In addition, if more than about 20 percent of the oxygen combusts within the oxidant supply duct the temperature of the remaining oxygen may increase to undesirable levels as will be discussed further below.

Within oxidant supply duct 4 the combustion reaction products mix with the remaining oxygen thus providing heat to the remaining oxidant and raising its temperature. Preferably, as illustrated in FIG. 1, fuel 6 is provided into oxidant supply duct 4 at a high velocity, typically greater than 200 fps and generally within the range of from 500 to 1500 fps. The high velocity serves to entrain oxidant into the combustion reaction 8 thus establishing a stable flame. The high velocity enables further entraining of combustion reaction products and oxidant into the combustion reaction, thus improving the mixing of the hot combustion reaction products with the remaining oxygen within the oxidant supply duct and thus more efficiently heating the remaining oxygen.

Generally the temperature of remaining oxidant within the oxidant supply duct is raised by at least about 500° F. and preferably by at least about 1000° F. It is preferred however that the temperature of the remaining oxidant within the oxidant supply duct not exceed about 3000° F. because above that temperature, dissociation of combustion reaction products increases markedly, causing overheating problems within the oxidant supply duct and the nozzle.

Figure 3:
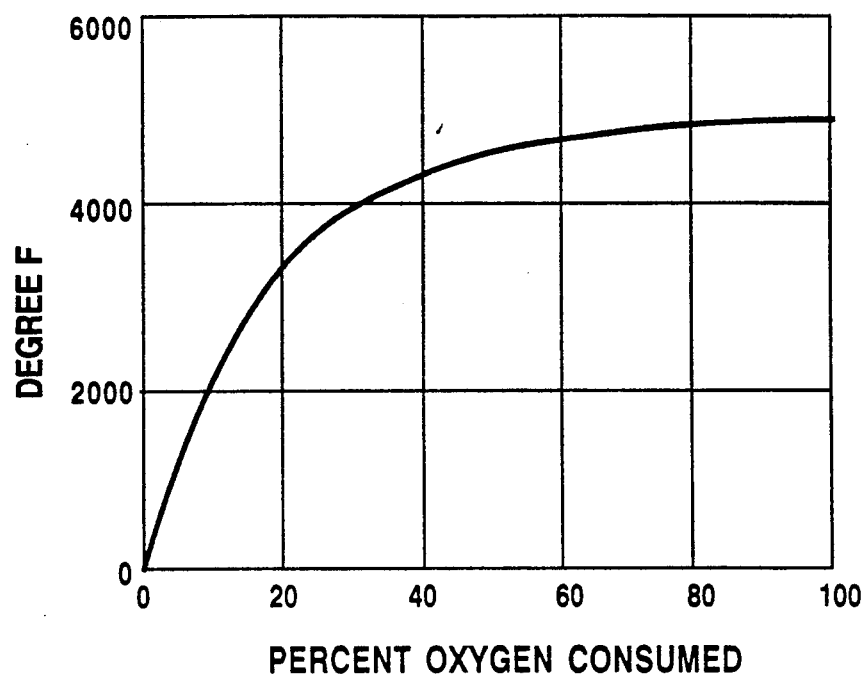
FIG. 3 is a graphical representation of the relationship of flame temperature for a natural gas-oxygen flame as a function of the oxygen consumption.

FIG. 3 graphically illustrates the calculated flame temperature for a natural gas-oxygen flame as a function of the percentage of oxygen consumed in the oxidant supply duct. As can be seen from FIG. 3, most of the temperature increase is achieved by combusting up to about 20 percent of the oxygen and exceeding about 20 percent consumption will increase the temperature beyond about 3000° F. resulting in the deleterious effects described.

Figure 4:
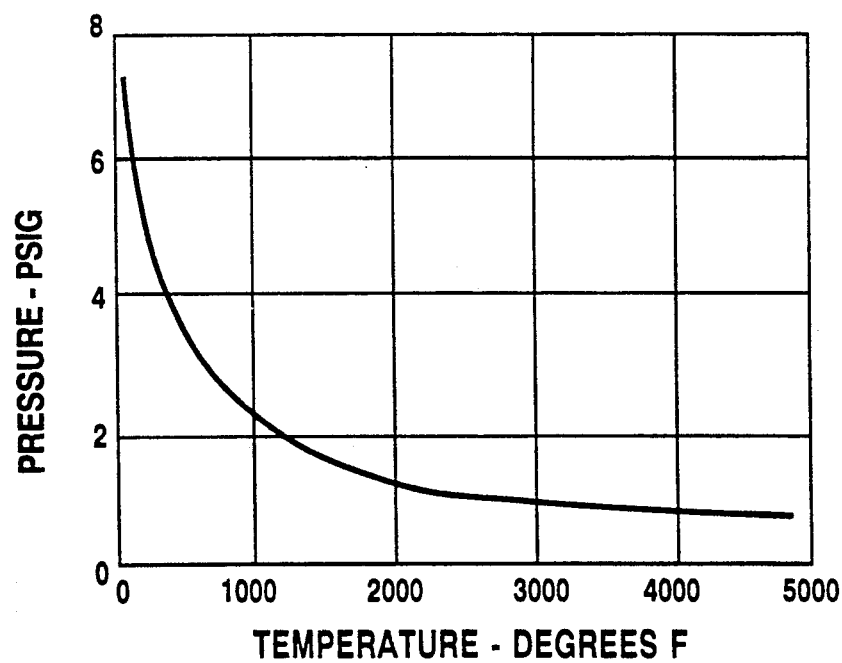
FIG. 4 is a graphical representation of the oxidant duct chamber pressure required to obtain an oxidant jet velocity of 800 feet per second as a function of the oxidant temperature in the oxidant duct chamber.

As the temperature of the remaining oxygen within the oxidant supply duct is increased, the requisite supply pressure of the oxidant provided into the oxidant supply duct to achieve any given oxidant injection velocity into the combustion zone decreases. This effect is illustrated graphically for a specific example in FIG. 4. The oxygen temperature is on the horizontal axis and the requisite pressure is on the vertical axis. The curve is the locus of points showing the relationship of these two parameters in order to achieve an oxidant injection velocity from the oxidant supply duct into the combustion zone of 800 fps. As can be seen from FIG. 4, when the oxygen is at ambient temperature the requisite pressure exceeds 7 pounds per square inch gauge (psig) in order to inject the oxygen into the combustion zone at a velocity of 800 fps. As the oxygen temperature increases, the requisite pressure decreases sharply. At a temperature of 1500° F. the requisite pressure is 1.65 psig and at a temperature of 3000° F. the requisite pressure is only 0.91 psig. At temperatures exceeding 3000° F. there is little additional benefit, thus providing another reason for not exceeding 20 percent oxygen combustion in the oxidant supply duct. Thus, as graphically illustrated in FIG. 4, the method of this invention can provide high velocity oxidant into a combustion zone without the need for a high supply pressure thus reducing or eliminating the need for compressing oxidant prior to passing it into the combustion zone which would otherwise be necessary if the oxidant source pressure is not high.

Referring back now to FIG. 1, the heated oxidant within oxidant supply duct 4 is passed out through opening 5 as high velocity oxidant stream 9 into combustion zone 2. Generally the exit velocity of heated oxidant stream 9 will be within the range of from 500 to 2000 fps and will exceed the initial velocity by at least 300 fps.

Preferably, as illustrated in FIG. 1, opening 5 will have a diameter less than the diameter of oxidant supply duct 4 as this will serve to improve the efficiency of the velocity enhancing method of this invention. Most preferably, as illustrated in FIG. 1, the decrease in diameter of opening 5 from that of oxidant supply duct 4 is achieved with a rounded or curved restriction. In this way the flow of gas approximates reversible and adiabatic flow. It is also possible to have a multi-hole exit nozzle at opening 5.

The oxidant passed into the combustion zone combusts with combustible matter within the combustion zone. The combustible matter may include for example gaseous fuel such as natural gas, methane, propane or hydrogen supplied to the combustion zone in an annular stream around the oxygen stream or through a separate lance, combustible organics evaporated from waste in the incineration of waste, and coal which is mixed in with the charge in a cement kiln.

Figure 2:
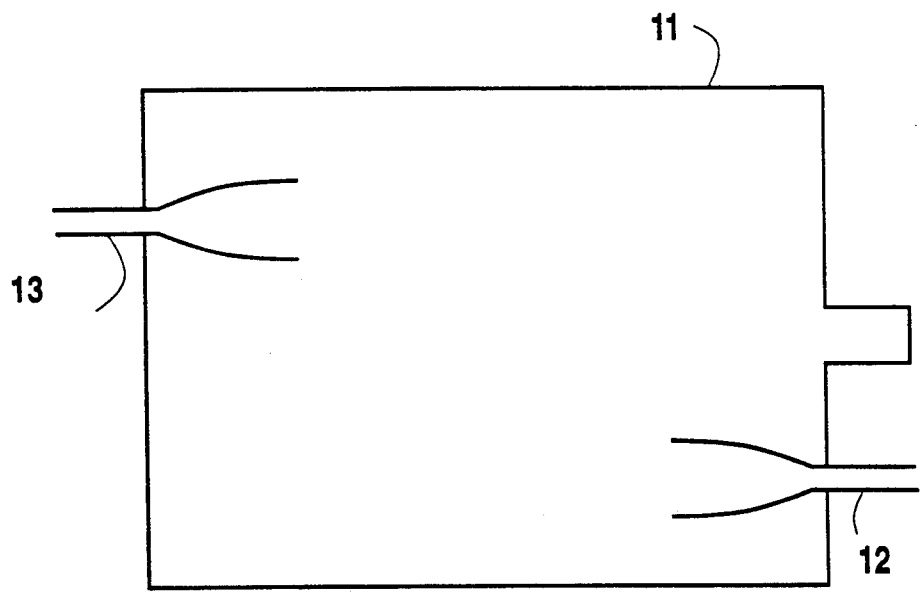
FIG. 2 is a representation of one embodiment of a combustion zone wherein fuel and oxidant are separately injected and wherein combustion is carried out.

The combustible matter is provided into the combustion zone separately from the oxidant passed into the combustion zone in stream 9. It may, for example, be provided into the combustion zone through a burner which also serves to inject the oxidant into the combustion zone adjacent to the injection of the combustible matter, or it may be provided into the combustion zone through a separate fuel lance, or by any other suitable means. FIG. 2 illustrates a simplified combustion zone 11 wherein high velocity heated oxidant is provided into the combustion zone through oxidant lance 13 and combustible matter such as natural gas is provided into the combustion zone separately from the oxidant through fuel lance 12 on different sides of the combustion zone. The fuel may also be provided into the combustion zone on the same side as the oxidant or provided into the combustion zone in any other manner such as being fed into the combustion zone as solid or liquid combustible waste material. The oxidant and combustible matter combust within the combustion zone thus generating heat. The combustion zone may be of any suitable system such as a heating furnace for, for example, steel, glass or aluminum, an incinerator, a kiln, or a drying furnace.

A major advantage of the invention is the ability to vary or control the velocity of the oxidant passed into the combustion zone by varying the amount of heat provided within the oxidant supply duct. In the case where heat is provided within the oxidant supply duct by combusting fuel with some of the oxidant, the amount of heat provided within the oxidant supply duct may be increased or decreased by increasing or decreasing the flowrate of the fuel provided into the oxidant supply duct. This will result in an increase or decrease in the oxidant velocity passing into the combustion zone without requiring a nozzle change or the use of an adjustable nozzle. This thermal nozzle control mechanism is a major advantage of the invention which, without changing the supply pressure, could not heretofore be done without changing a mechanical nozzle or using an adjustable mechanical nozzle.

Now by the use of the invention, one can provide high velocity oxidant into a combustion zone when the oxidant supply pressure is low while avoiding or reducing the need for oxidant compression. In addition, the invention enables one to easily increase or decrease the oxidant injection velocity into the combustion zone at any given oxidant supply pressure, enabling improved control over the combustion reaction within the combustion zone without changing nozzles or using an adjustable nozzle to inject the oxidant.

Although the invention has been described in detail with reference to a certain preferred embodiment, those skilled in the art will recognize that there are other embodiments of the invention within the spirit and scope of the claims.

I claim:
1. Thermal nozzle combustion method comprising:
(A) providing oxidant having an oxygen concentration of at least 30 volume percent at an initial velocity less than 300 fps within an oxidant supply duct communicating with a combustion zone;
(B) providing fuel separately from oxidant into the oxidant supply duct at a high velocity of greater than 200 feet per second and greater than said oxidant initial velocity entraining oxidant into the high velocity fuel, combusting up to about 20 percent of the oxygen of the oxidant provided into the oxidant supply duct with the fuel to produce heat and combustion reaction products in a combustion reaction, and further entraining combustion reaction products and oxidant into the combustion reaction;
(C) mixing combustion reaction products with remaining oxygen of the oxidant within the oxidant supply duct and raising the temperature of remaining oxidant within the oxidant supply duct; and
(D) passing heated oxidant out from the oxidant supply duct into the combustion zone at an exit velocity which exceeds the initial velocity by at least 300 feet per second.

2. The method of claim 1 wherein the oxidant has an oxygen concentration of at least 85 volume percent.

3. The method of claim 1 wherein the temperature of the oxidant is raised to a temperature not exceeding 3000° F.

4. The method of claim 1 wherein heated oxidant is passed into the combustion zone through at least one opening whose diameter is less than the diameter of the oxidant supply duct.

5. The method of claim 1 further comprising varying the flowrate of fuel provided into the oxidant supply duct and consequently varying the exit velocity of the oxidant passed into the combustion zone.

6. The method of claim 1 further comprising providing combustible matter into the combustion zone and combusting heated oxidant with combustible matter within the combustion zone.

* * * * *

UNITED STATES PATENT AND TRADEMARK OFFICE
CERTIFICATE OF CORRECTION

PATENT NO. : 5,266,024
DATED : November 30, 1993
INVENTOR(S) : J.E. Anderson

It is certified that error appears in the above-identified patent and that said Letters Patent is hereby corrected as shown below:

Column 6, line 28:

In claim 1, line 9 insert a comma between "velocity" and "entraining".

Signed and Sealed this

Nineteenth Day of April, 1994

Attest:

BRUCE LEHMAN

*Attesting Officer*     *Commissioner of Patents and Trademarks*